United States Patent
Hyun (10) Patent No.: US 9,001,633 B2
(45) Date of Patent: Apr. 7, 2015

(54) METHOD AND APPARATUS FOR PREVENTING THE READING OF AN OPTICAL DISC

(71) Applicant: Toshiba Samsung Storage Technology Korea Corporation, Suwon-si (KR)

(72) Inventor: Sang Hoon Hyun, Seongnam-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 14/172,977

(22) Filed: Feb. 5, 2014

(65) Prior Publication Data

US 2014/0223454 A1  Aug. 7, 2014

(30) Foreign Application Priority Data

Feb. 6, 2013  (KR) .................. 10-2013-0013229

(51) Int. Cl.
*G11B 19/02*  (2006.01)
*G11B 7/0037*  (2006.01)

(52) U.S. Cl.
CPC .................................. *G11B 7/0037* (2013.01)

(58) Field of Classification Search
None
See application file for complete search history.

(56) References Cited

U.S. PATENT DOCUMENTS

| | | | | |
|---|---|---|---|---|
| 7,340,616 | B2 * | 3/2008 | Rothman et al. | 713/300 |
| 7,673,159 | B2 * | 3/2010 | Aoyagi et al. | 713/310 |
| 7,836,319 | B2 * | 11/2010 | Oh et al. | 713/323 |
| 2009/0103404 | A1 * | 4/2009 | Chiu | 369/47.5 |
| 2010/0199292 | A1 * | 8/2010 | Yuan et al. | 720/601 |
| 2012/0066527 | A1 * | 3/2012 | Mizuura | 713/320 |

* cited by examiner

*Primary Examiner* — Brenda Bernardi
(74) *Attorney, Agent, or Firm* — NSIP Law

(57) ABSTRACT

Provided is a method and an apparatus for setting a virtual disc status of an optical disc drive. While set to the virtual disc status, the optical disc drive does not detect if an optical disc is present in the optical disc drive in response to the optical disc drive being powered on. Accordingly, power consumption and noise may be reduced.

20 Claims, 7 Drawing Sheets

METHOD AND APPARATUS FOR PREVENTING THE READING OF AN OPTICAL DISC

CROSS-REFERENCE TO RELATED APPLICATION

This application claims the benefit under 35 USC 119(a) of Korean Patent Application No. 10-2013-0013229, filed on Feb. 6, 2013, in the Korean Intellectual Property Office, the entire disclosure of which is incorporated herein by reference for all purposes.

BACKGROUND

1. Field

The following description relates to a method of processing a virtual disc status, and more particularly, to a method that sets a virtual disc status of an optical disc drive.

2. Description of Related Art

When power is supplied while an optical disc is inserted into an optical disc drive, the optical disc drive may operate a spindle motor and an optical pick-up to recognize the optical disc. Here, the recognizing of the optical disc may be performed automatically as a result of power being supplied to the optical disc drive, irrespective of use of the optical disc.

During the optical disc recognition, the optical disc drive may generate noise. Also, the optical disc drive may consume power unnecessarily during the process of recognizing the optical disc, irrespective of the user of the optical disc.

To solve these issues, a user may withdraw the optical disc from the optical disc drive and separately may store the optical disc, for example, if the optical disc has a low frequency of use. However, in a case of an optical disc having a high frequency of use, an inconvenience issue may arise because the user may perform repeated insertion and withdrawal operations of the optical disc each time the optical disc is used.

Accordingly, the optical disc drive may perform the process of unnecessarily recognizing the optical disc whenever power is supplied because the optical disc is stored in the optical disc drive. Also, the optical disc drive may generate noise and consume power unnecessarily when the process of recognizing of the optical disc is performed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect, there is provided a method for setting a status of an optical disc drive to a virtual disc status in which a detection of an optical disc is prevented, the method including detecting whether an optical disc is present in the optical disc drive based on power that is supplied from a user terminal, informing the user terminal of whether the optical disc is present within the optical disc drive based on the detection process, receiving a setting request associated with a virtual disc status of the optical disc drive from the user terminal, and setting the optical disc drive to the virtual disc status in which the optical disc drive is prevented from subsequently detecting the presence of the optical disc.

The user terminal may be configured to block a supply of power to the optical disc drive in response to the optical disc drive being set to the virtual disc status.

The detecting of the optical disc may comprise determining at least one of whether an optical disc is present in the optical disc drive, a file size of the optical disc, and a type of the optical disc.

The setting request associated with the virtual disc status of the optical disc drive may be input from a user via an application executed by the user terminal, or the setting request may be generated automatically based on a processing pattern associated with a processing time or a processing period of the optical disc.

The method may further comprise informing the user terminal that the optical disc drive is set to the virtual disc status, receiving a cancellation request of the virtual disc status from the user terminal, and performing a detection process of the optical disc in response to receiving the cancellation request.

The user terminal may be configured to provide a power supply to the optical disc drive in response to the virtual disc status of the optical disc drive being cancelled.

The receiving of the cancellation request of the virtual disc status from the user terminal may comprise receiving an input of the cancellation request from a user via an application executed by the user terminal.

The receiving of the cancellation request of the virtual disc status from the user terminal may comprise detecting a pressing of an eject button of the optical disc drive.

The method may further comprise deleting the virtual disc status stored in a non-volatile memory of the optical disc drive in response to the virtual disc status of the optical disc drive being cancelled.

In an aspect, there is provided a method of determining a virtual disc status of an optical disc drive, the method including verifying whether an optical disc drive is set in a virtual disc status in which the optical disc drive is prevented from detecting a presence of an optical disc, in response to power being supplied from a user terminal, determining whether to perform a detection process of an optical disc, based on whether the optical disc drive is set to the virtual disc status, and in response to the optical disc drive not being set to the virtual disc status, providing a result of the detection process of the optical disc to the user terminal.

The determining of whether to perform the detection process of the optical disc may comprise performing the detection process of the optical disc in response to the optical disc drive not being set to the virtual disc status, and omitting the detection process of the optical disc in response to the optical disc drive being set to the virtual disc status.

The user terminal may be configured to block power to the optical disc drive in response to the optical disc drive being set to the virtual disc status.

The user terminal may be configured to provide a power supply to the optical disc drive in response to the virtual disc status of the optical disc drive being cancelled.

In an aspect, there is provided a method of a user terminal for processing a virtual disc status of an optical disc drive, the method including reading content of an optical disc in response to the optical disc being present in the optical disc drive that is electrically connected to the user terminal, and transferring a setting request to the optical disc drive to set the optical disc drive to the virtual disc status to prevent the optical disc drive from subsequently detecting the presence of the optical disc, wherein the user terminal is configured to transfer the setting request to the optical disc drive based on an input of the setting request from a user via an application executed by the user terminal, or by the setting request being generated automatically based on a processing pattern associated with a processing time and/or a processing period of the optical disc drive.

The optical disc drive may be configured to be set to the virtual disc status, based on the setting request received from the user terminal.

In an aspect, there is provided a method of a user terminal for processing a virtual disc status of an optical disc drive, the method including receiving an input of the optical disc drive that is set to a virtual disc status in which a detection of an optical disc is prevented, and transferring a cancellation request to the optical disc drive to cancel the virtual disc status of the optical disc drive, wherein the user terminal is configured to transfer the cancellation to the optical disc drive based on receiving an input of the cancellation request from a user via an application executed by the user terminal, or by detecting a pressing of an eject button of the optical disc drive.

The user terminal may be configured to block a supply of power to the optical disc drive in response to the optical disc drive being set to the virtual disc status, and to provide the supply of power to the optical disc drive in response to the virtual disc status of the optical disc drive being cancelled.

In an aspect, there is provided an optical disc drive, including a detection process performer configured to inform a user terminal whether an optical disc drive is present in the optical disc drive by performing a detection process of the optical disc, a status receiver configured to receive a setting request associated with a virtual disc status of the optical disc drive from the user terminal, and a status setter configured to set the optical disc drive to the virtual disc status in which the detection processor performer is prevented from performing the detection process of the optical disc, and to store the virtual disc status based on the setting request.

In an aspect, there is provided an optical disc drive, including a status informer configured to inform a user terminal of whether the optical disc drive is set to a virtual disc status in which the optical disc drive is prevented from detecting a presence of an optical disc, a cancellation unit configured to cancel the virtual disc status based on a cancellation request that is received from a user terminal, and a detection process performer configured to perform a detection process of the optical disc in response to the cancellation request.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

The features described herein may be embodied in different forms, and are not to be construed as being limited to only the examples described herein. Rather, the examples described herein are provided so that this disclosure will be thorough and complete, and to convey the full scope of the disclosure to one of ordinary skill in the art.

Figure 1:
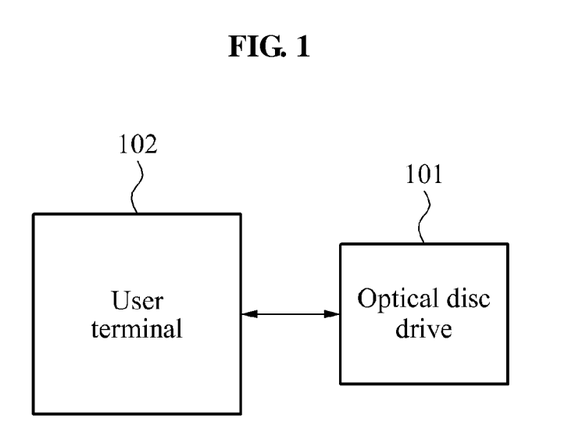
FIG. 1 is a diagram illustrating an example of a user terminal and an optical disc drive for setting a virtual disc status.

FIG. 1 illustrates an example of an optical disc drive 101 able to be set in a virtual disc status.

Referring to FIG. 1, the optical disc drive 101 may be used in conjunction with a user terminal 102. For example, the optical disc drive 101 may be used in conjunction with the user terminal 102, such as a television, a monitor, and the like. As another example, the optical disc drive 101 may be included inside the user terminal 102. For example, the optical disc drive 101 may be included in a computer, a laptop, a gaming console, and the like.

The optical disc drive 101 may perform a detection process of the optical disc when power is supplied from the user terminal 102. The detection process may determine, for example, whether there is an optical disc inserted into the optical disc drive 101, a file size of the optical disc, a type of the optical disc, and the like. Here, the detection process may be performed irrespective of whether an optical disc is present in a tray of the optical disc drive 101.

The optical disc drive 101 may inform the user terminal 102 of whether the optical disc is present, based on the detection process. According to various aspects, the optical disc drive 101 may receive a setting request of a virtual disc status of the optical disc drive 101 from the user terminal 102. The optical disc drive 101 may store the virtual disc status in a memory of the optical disc drive 101, corresponding to the received setting request. For example, the memory may be a non-volatile memory. Accordingly, the virtual disc status can be maintained even with the powering off of the optical disc drive 101. Also, the optical disc drive 101 may set the optical disc drive 101 to be in the virtual disc status, in response to the received setting request.

For example, an optical disc may be inserted in the optical disc drive 101. While inserted, the optical disc drive may be in a "DISC" status in which the optical disc is inserted in the optical disc drive 101. However, in response to the setting request, the virtual disc statues of the optical disc drive 101 may be set to a "NO DISC" status in which the optical disc drive acts as if the optical disc is not inserted. Here, the optical disc may be physically present in the "NO DISC" status, however, the optical disc may be absent virtually. In this example, the optical disc drive does not perform the recognition of the disc when the optical disc drive is powered on. Accordingly, power may be consumed and noise may be reduced.

In this example, the virtual disc status may refer to a status in which the optical disc is recognized as not being inserted in the optical disc drive 101, even though the optical disc is actually inserted. Further, when the optical disc drive 101 is set to be in the virtual disc status, a power supply may be blocked to the optical disc drive 101 from the user terminal 102.

The optical disc drive 101 may verify whether the optical disc drive 101 is set to the virtual disc status when power is supplied from the user terminal 102. In this example, the optical disc drive 101 may determine whether to perform the detection process of the optical disc, based on whether the optical disc drive 101 is set to be in the virtual disc status. The optical disc drive 101 may provide a result of performing the detection process of the optical disc to the user terminal 102.

In some examples, the optical disc drive 101 may inform the user terminal 102 that the optical disc drive 101 is set to the virtual disc status. Here, the optical disc drive 101 may receive a cancellation request of the virtual disc status from the user terminal 102, and perform the detection process of the optical disc, based on the cancellation request.

According to various aspects, the optical disc drive 101 may reduce noise and power consumption by omitting a process of recognizing the optical disc based on the virtual disc status being set accordingly.

Figure 2:
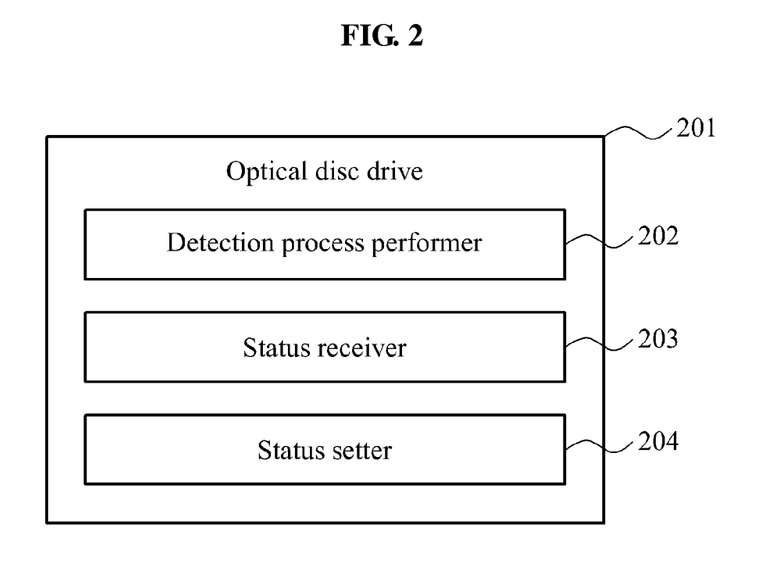
FIG. 2 is a diagram illustrating an example of an optical disc drive that sets a virtual disc status.

FIG. 2 illustrates an example of an optical disc drive 201 that sets a virtual disc status.

Referring to FIG. 2, the optical disc drive 201 includes a detection process performer 202, a status receiver 203, and a status setter 204. The optical disc drive 201 may set the optical disc drive 201 to be in the virtual disc status in which an optical disc is recognized as not being inserted in the optical disc drive 201, even though the optical disc is actually inserted.

The detection process performer 202 may detect whether an optical disc is inserted in the optical disc drive 201 when power is supplied the optical disc drive 201. The detection process may be performed irrespective of whether the optical disc is present in a tray. For example, the detection process may determine whether the optical disc is present in the optical disc drive 201, a file size of the optical disc, a type of the optical disc, and the like.

The detection process performer 202 may transmit whether the optical disc is present to the user terminal, based on the detection process. Accordingly, the user terminal may read content of the optical disc when the optical disc is present.

The status receiver 203 may receive a setting request associated with the virtual disc status of the optical disc drive 201 from the user terminal. For example, the setting request may be input from a user via an application executed in the user terminal. As another example, the setting request may be automatically generated based on a processing pattern associated with a processing time or a processing period of the optical disc drive 201.

The user terminal may provide an interface that displays the setting request associated with the virtual disc status of the optical disc drive 201 to the user. In this example, the interface may be provided in various types of pop-up windows, selection menus, and the like. The user may set the virtual disc status of the optical disc drive 201, for example, by selecting the setting request associated with the virtual disc status via the interface.

The user terminal may set a predetermined reference value for entering the virtual disc status. For example, the virtual disc status may be entered in a case in which the optical disc has not been used by the user for a predetermined period of time from a current point of time, or has been used but frequency use of the optical disc is low. The user terminal may set the setting request associated with the virtual disc status of the optical disc drive 201, based on the processing pattern of the optical disc drive 201 such as the processing time or the processing period.

In this example, the user terminal may reduce an inconvenience of a user having to enter an input of the setting request each time power is supplied to the optical disc drive 201, because the setting request is generated automatically based on the processing pattern of the optical disc drive 201 without receiving input from the user.

The status receiver 203 may receive the setting request set by the user terminal. The status setter 204 may store the virtual disc status in a memory of the optical disc drive 201, in response to the setting request. Here, the optical disc drive 201 may use a non-volatile memory in which stored content is not lost when a power supply is blocked. For example, the optical disc drive 201 may store the virtual disc status in a flash memory that is used as a storage memory of a drive. Furthermore, the status setter 204 may set the optical disc drive 201 to be in the virtual disc status, based on the setting request.

The optical disc drive 201 may indicate to the user terminal that the optical disc drive 201 is set in the virtual disc status. Accordingly, the user terminal may block the power supply to the optical disc drive 201 when the optical disc drive 201 is set to be in the virtual disc drive. Therefore, the optical disc drive 201 may be in a status in which the power supply is blocked by the user terminal. Accordingly, the optical disc drive 201 may reduce unnecessary power consumption based on the virtual disc status.

Figure 3:
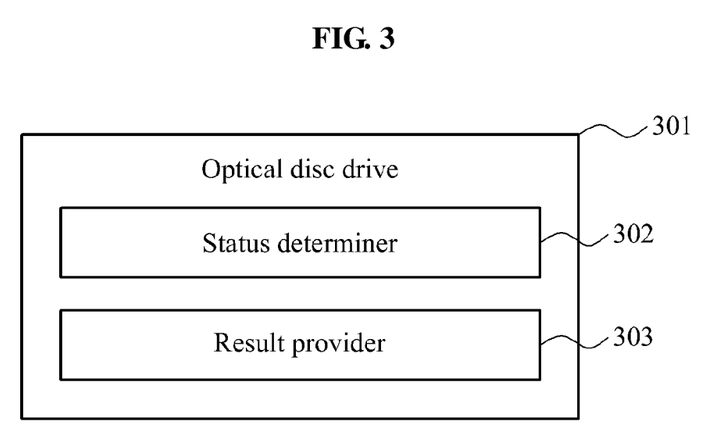
FIG. 3 is a diagram illustrating an example of an optical disc drive that operates based on a virtual disc status.

FIG. 3 illustrates an example of an optical disc drive 301 that operates based on a virtual disc status.

Referring to FIG. 3, the optical disc drive 301 includes a status determiner 302 and a result provider 303. The optical disc drive 301 may operate as if the optical disc drive 301 is set in the virtual disc status.

The status determiner 302 may verify whether the optical disc drive 301 is set in the virtual disc status state when power is supplied from a user terminal. For example, the status determiner 302 may verify the virtual disc status of the optical disc drive 301 which may be stored in a non-volatile memory of the optical disc drive 301, and thereby verify whether the optical disc drive 301 is set to be in the virtual disc status.

The status determiner 302 may determine whether to perform a detection process of an optical disc, based on whether the optical disc is set in the virtual disc status. For example, the status determiner 302 may not perform the detection process of the optical disc when the optical disc drive 301 is in the virtual disc status. On the other hand, the status determiner 302 may perform the detection process of the optical disc when the optical disc drive 301 is not in the virtual disc status.

For example, when the optical disc drive 301 is in the virtual disc status, a "Virtual No Disc Status" may be set to be "Set". Also, when the optical disc drive 301 is not in the virtual disc status, "Virtual No Disc Status" may be set to be "Not Set".

The result provider 303 may provide a result of the detection process of the optical disc to the user terminal. The result provider 303 may provide the result in which the detection process is not performed being to the user terminal. In this example, the result provider 303 may provide the optical disc drive 301 an indication that the drive is in the virtual disc status, such as the status being "Set" in the "Virtual No Disc Status" to the user terminal. Also, the result provider 303 may provide information on whether to perform the detection process based on the result of performing the detection process to the user terminal.

The user terminal may not read content of the optical disc included in the optical disc drive when the optical disc drive is in the virtual disc status. Further, the user terminal may display the virtual disc status. By way of example, the user terminal may display the virtual disc status, for example, "Virtual No Disc", using a pop-up window, a speech bubble, and the like.

Also, the user terminal may block a power supply to the optical disc drive 301 when the optical disc drive 301 is in the virtual disc status. Here, the user terminal may receive information from the optical disc drive 301 as to whether to perform the detection process, and perform the power supply for operating the optical disc drive.

Figure 4:
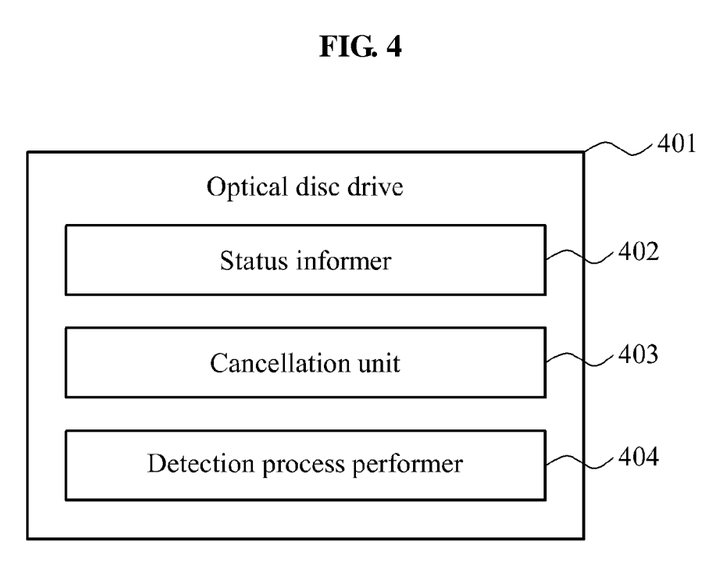
FIG. 4 is a diagram illustrating an example of an optical disc drive that is capable of requesting cancellation a virtual disc status.

FIG. 4 illustrates an example of an optical disc drive 401 that is capable of requesting cancellation of a virtual disc status.

Referring to FIG. 4, the optical disc drive 401 includes a status informer 402, a cancellation unit 403, and a detection process performer 404. The optical disc drive 401 may operate to cancel the virtual disc status.

The status informer 402 may inform a user terminal that the optical disc drive 401 is set to the virtual disc status. For example, the optical disc drive 401 may verify that the virtual disc status stored in a memory of the optical disc drive 401 is set. Also, the user terminal may display content of the optical disc without reading the content when the optical disc drive 401 is in the virtual disc status.

The cancellation unit 403 may receive a cancellation request from the user terminal for the virtual disc status. The cancellation request may be input from a user via an application that is executed in the user terminal. For example, the user terminal may provide an interface for displaying a setting request associated with the virtual disc status. The interface may be provided in various types, such as a pop-up window, a selection menu, and the like. In this example, the user may request the virtual disc status to be cancelled using the interface. For example, the user may set the cancellation request to change a status from "Virtual No Disc Status" to "Disc Status".

The cancellation request may detect an eject button of the optical disc drive 401 being pressed. For example, the optical disc drive 401 may be projected externally based on the eject button being pressed by the user. Here, the optical disc drive 401 may detect the pressing of the eject button, and may perform the cancellation request for changing a status from "Virtual No Disc Status" to "Disc Status".

The user terminal may block a power supply to the optical disc drive 401 when the optical disc drive 401 is in the virtual disc status. Further, the user terminal may provide the power supply to the optical disc drive 401 when the virtual disc status of the optical disc drive 401 is cancelled. Moreover, the user terminal may provide a "Virtual No Disc Status command" associated with the cancellation request to the optical disc drive 401.

The cancellation unit 403 may cancel the virtual disc status of the optical disc drive 401, in response to the cancellation request received. The cancellation unit 403 may invalidate the virtual disc status stored in the optical disc drive 401 when the virtual disc status of the optical disc drive 401 is cancelled. For example, the cancelation unit 403 may delete the virtual disc status stored in the memory of the optical disc drive 401. For example, the optical disc drive 401 may invalidate stored content that is associated with the virtual disc status of the optical disc drive 401 stored in a non-volatile flash memory.

The detection process performer 404 may perform the detection process of the optical disc, in response to the cancellation request.

While FIGS. 2, 3, and 4 separately illustrate various examples of an optical disc drive, it should be appreciated that a single optical disc drive may include all of the features of FIGS. 2, 3, and 4. It should also be appreciated that a single optical disc drive may include some of the components or all of the components of FIGS. 2, 3, and 4.

Figure 5:
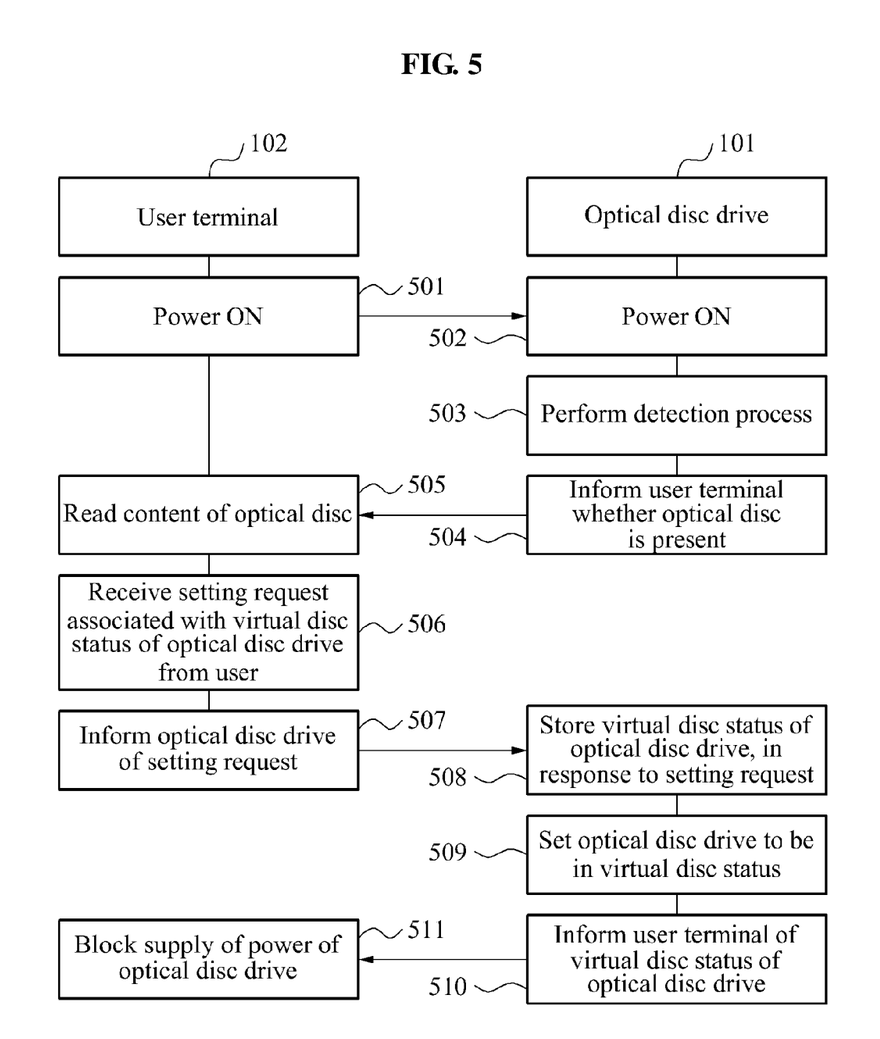
FIG. 5 is a diagram illustrating an example of a method of setting a virtual disc status of an optical disc drive.

FIG. 5 illustrates an example of a method of setting a virtual disc status of an optical disc drive.

Referring to FIG. 5, in 501, the user terminal 102 is provided with power from an external source. The user terminal 102 may supply power to the optical disc drive 101 when power is supplied from the external source. For example, the user terminal 102 may be provided with power through a user power operation for operating the user terminal 102.

In 502, the optical disc drive 101 is provided with power from the user terminal 102, irrespective of a presence of an optical disc. In 503, the optical disc drive 101 performs a detection process of the optical disc based on the supplied power. Here, the detection process may be performed irrespective of the presence of an optical disc in the optical disc drive 101. In 504, the optical disc drive 101 informs the user terminal 102 of whether the optical disc is present based on the detection process.

In 505, the user terminal 102 receives information as to whether the optical disc is present from the optical disc drive 101. Also, the user terminal 102 may read content of the optical disc when the optical disc is present.

In 506, the user terminal 102 receives a setting request associated with the virtual disc status of the optical disc drive 101 from the user. Here, the user terminal 102 may receive an input from a user via an application executed in the user terminal 102. As another example, in the user terminal 102, the setting request may be generated automatically based on a processing pattern associated with a processing time and/or a processing period of the optical disc drive 101. For example, the user terminal 102 may generate the setting request to change a status of the optical disc of the optical disc drive 101 from a "Disc" status to a "Virtual No Disc" status, based on the user or the processing pattern.

In 507, the user terminal 102 informs the optical disc drive 101 of the setting request. For example, the user terminal 102 may inform the optical disc drive 101 of a "Send Virtual Disc Vendor Unique Command" associated with the setting request. In 508, the optical disc drive 101 stores the virtual disc status in a memory of the optical disc drive 101, in response to the setting request. As used herein, the memory may refer to a non-volatile memory, for example, a flash memory.

In 509, the optical disc drive 101 sets the optical disc drive 101 to the virtual disc status, in response to the setting request. For example, the virtual disc status may be set in order to use the optical disc drive 101 as in a situation in which the optical disc is not inserted in the optical disc drive 101 even though the optical disc is inserted in the optical disc drive 101. For example, the optical disc drive 101 may set to the "Virtual No Disc" status.

In 510, the optical disc drive 101 informs the user terminal 102 that the optical disc drive 101 is in the virtual disc status. In 511, the user terminal 102 blocks the power supply of the optical disc drive 101, corresponding to the optical disc drive 101 being set in the virtual disc status. The optical disc drive 101 reduces power consumption for use of the optical disc drive 101 by blocking the power supply based on the virtual disc status.

Figure 6:
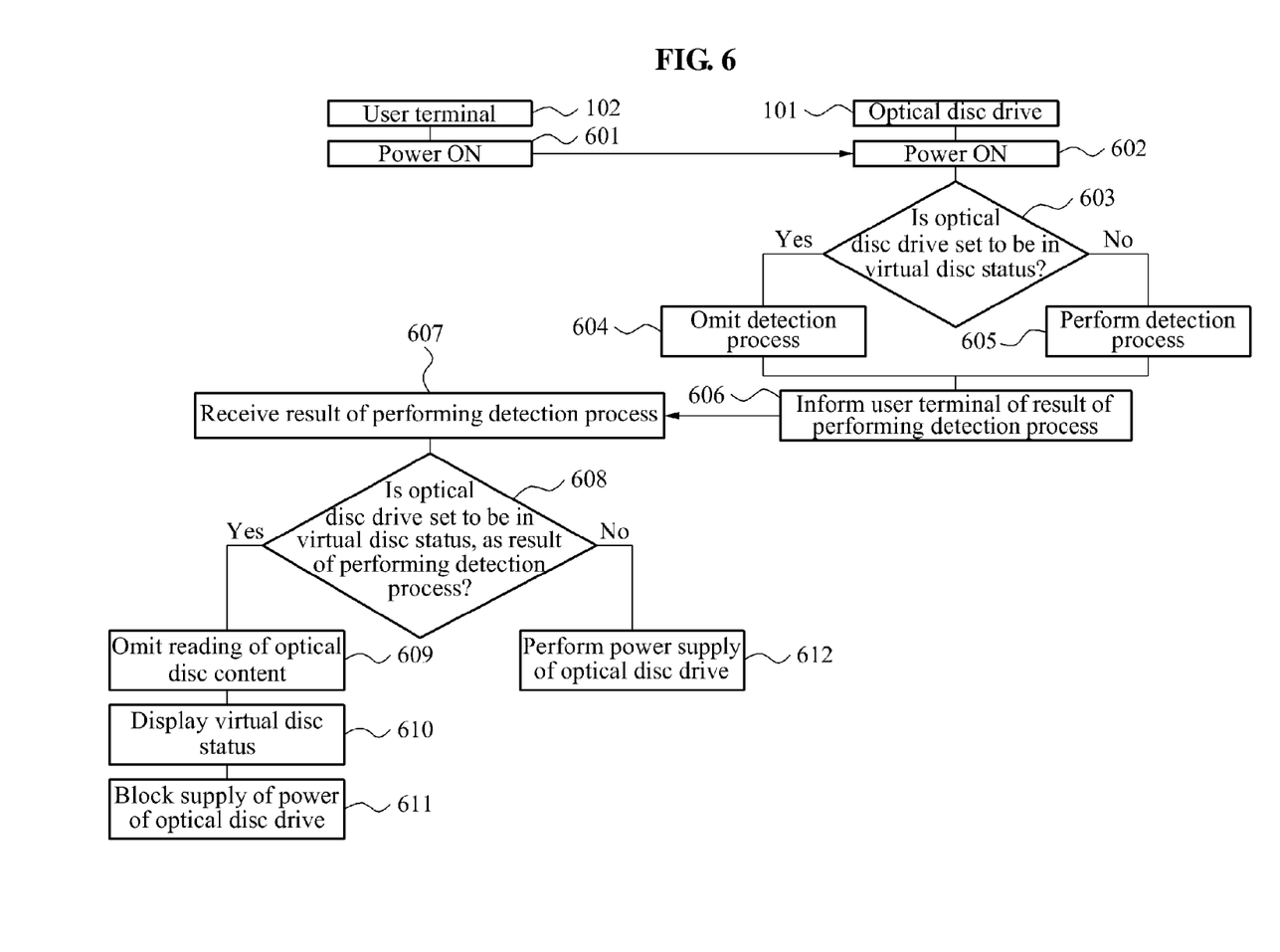
FIG. 6 is a diagram illustrating an example of a method of an optical disc drive operating based on a virtual disc status.

FIG. 6 illustrates an example of a method of an optical disc drive operating in a virtual disc status.

Referring to FIG. 6, in 601, the user terminal 102 is provided with power from an external source. Also, the user terminal 102 may supply power to the optical disc drive 101 when power is supplied from the external source.

In 602, the optical disc drive 101 is provided with power from the user terminal 102, irrespective of a presence of an optical disc. In 603, the optical disc drive 101 verifies whether the optical disc drive is in the virtual disc status. For example, the optical disc drive 101 may verify whether the optical disc drive 101 is "Set" or "Not Set" in "Virtual No Disc".

In 604, when the optical disc drive 101 is in the virtual disc status, the optical disc is considered to be absent, and a detection process is not performed. For example, the optical disc drive 101 may be "Set" in "Virtual No Disc". In 605, when the optical disc drive 101 is not in the virtual disc status, the detection process is performed, irrespective of the presence of the optical disc. Here, the optical disc drive 101 may be "Not Set" in "Virtual No Disc".

In 606, the optical disc drive 101 informs the user terminal 102 of a result of performing the detection process. For example, the optical disc drive 101 may inform the user terminal 102 that the optical disc drive 101 is set to the virtual disc status, corresponding to the status being "Set" in "Virtual No Disc". The optical disc drive 101 may inform the user terminal 102 of the result of performing the detection process, corresponding to the status of being "Not Set" in "Virtual No Disc".

In 607, the user terminal 102 receives the result of the detection process. In 608, the user terminal 102 verifies whether the optical disc drive 101 is set to the virtual disc status, based on the received result of performing the detection process.

In 609, the user terminal 102 does not read content of the optical disc if the optical disc drive 101 is set to the virtual disc status. For example, the result of not performing the detection process may include a result of setting the optical disc drive 101 to the virtual disc status, corresponding to a status being "Set" in "Virtual No Disc".

In 611, the user terminal 102 blocks the power supply of the optical disc drive 101, corresponding to the optical disc drive 101 being set in the virtual disc status. Alternatively, in 612, the user terminal 102 provides the power supply to the optical disc drive 101 when the optical disc drive 101 is not set to the virtual disc status. Here, the result of providing the power supply may include a result of performing the detection process, corresponding to the status of being "Not Set" in "Virtual No Disc".

Figure 7:
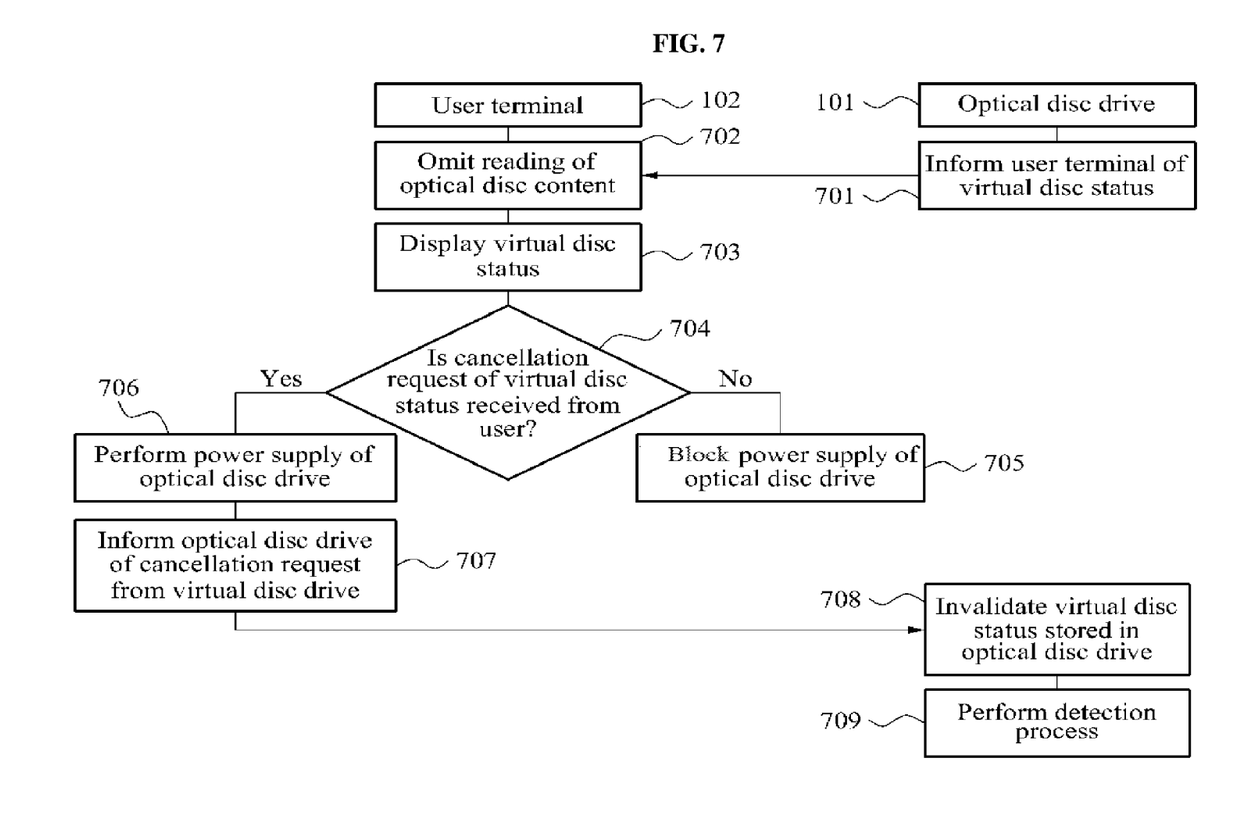
FIG. 7 is a diagram illustrating an example of a method of an optical disc drive requesting to cancel a virtual disc status.

FIG. 7 illustrates an example of a method of processing a virtual disc status of an optical disc drive requesting cancellation of a virtual disc status.

Referring to FIG. 7, in 701, the optical disc drive 101 informs the user terminal 102 that the optical disc drive 101 is set to the virtual disc status. Here, the optical disc drive 101 may verify a presence of a memory of the optical disc drive in which the virtual disc status is stored, and verify that the optical disc drive 101 is set to the virtual disc status.

In 702, the user terminal 102 does not read content of an optical disc, corresponding to the optical disc drive 101 being set in the virtual disc status received. In 703, the user terminal 102 displays that the user terminal 102 is set to the virtual disc status. For example, the user terminal 102 may use a pop-up window, and the like, for displaying information.

In 704, the user terminal 102 receives a cancellation request of the virtual disc status from a user. The user terminal 102 may receive the cancellation request, in response to an operation of the user, through displaying content associated with the cancellation request of the virtual disc status to the user.

In contrast, in 705, the user terminal 102 does not receive the cancellation request from the user. Here, the user terminal 102 may proceed with an operation of blocking a power supply of the optical disc drive 102 as the cancellation request is not received.

In 706, the user terminal 102 provides the power supply to the optical disc drive 101, through receiving the cancellation request. In 707, the user terminal 102 informs the optical disc drive 101 of the cancellation request of the virtual disc status. In particular, the user terminal 102 may inform the optical disc drive 101 of a "Send disabling Virtual No Disc Status command" associated with the cancellation request.

In 708, the optical disc drive 101 invalidates the virtual disc status stored in the memory of the optical disc drive 101, in response to the cancellation request. In 709, the optical disc drive 101 performs the detection process of the optical disc as the virtual disc status is invalidated.

According to various aspects, it is possible to facilitate user convenience in use and storage of an optical disc, through an optical disc drive that minimizes or otherwise reduces an operation of a user inserting and withdrawing an optical disc. The optical disc drive may also reduce an occurrence of noise and unnecessary power consumption.

According to various aspects, it is possible to reduce noise that occurs during a process of recognizing an optical disc, by allowing a user to selectively set a virtual disc status of the optical disc drive, and thus reducing the process of recognizing the optical disc.

According to various aspects, it is possible to reduce power consumption of the optical disc drive, by allowing a user to selectively set a virtual disc status of the optical disc drive, and thus blocking or preventing power from being supplied to the optical disc drive.

The processes, functions, methods and/or software described above including a method of processing a virtual disc status of an optical disc may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media such as hard disks, floppy to disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a non-transitory computer-readable storage medium may be distributed among computer systems connected through a network and non-transitory computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for setting a status of an optical disc drive to a virtual disc status in which a detection of an optical disc is prevented, the method comprising:
   detecting whether an optical disc is present in the optical disc drive based on power that is supplied from a user terminal;
   informing the user terminal of whether the optical disc is present within the optical disc drive based on the detection process;
   receiving a setting request associated with a virtual disc status of the optical disc drive from the user terminal; and
   setting the optical disc drive to the virtual disc status in which the optical disc drive is prevented from subsequently detecting the presence of the optical disc.

2. The method of claim 1, wherein the user terminal is configured to block a supply of power to the optical disc drive in response to the optical disc drive being set to the virtual disc status.

3. The method of claim 1, wherein the detecting of the optical disc comprises:
   determining at least one of whether an optical disc is present in the optical disc drive, a file size of the optical disc, and a type of the optical disc.

4. The method of claim 1, wherein the setting request associated with the virtual disc status of the optical disc drive is input from a user via an application executed by the user terminal, or the setting request is generated automatically based on a processing pattern associated with a processing time or a processing period of the optical disc.

5. The method of claim 1, further comprising:
   informing the user terminal that the optical disc drive is set to the virtual disc status;
   receiving a cancellation request of the virtual disc status from the user terminal; and
   performing a detection process of the optical disc in response to receiving the cancellation request.

6. The method of claim 5, wherein the user terminal is configured to provide a power supply to the optical disc drive in response to the virtual disc status of the optical disc drive being cancelled.

7. The method of claim 5, wherein the receiving of the cancellation request of the virtual disc status from the user terminal comprises receiving an input of the cancellation request from a user via an application executed by the user terminal.

8. The method of claim 5, wherein the receiving of the cancellation request of the virtual disc status from the user terminal comprises detecting a pressing of an eject button of the optical disc drive.

9. The method of claim 5, further comprising:
   deleting the virtual disc status stored in a non-volatile memory of the optical disc drive in response to the virtual disc status of the optical disc drive being cancelled.

10. A method of determining a virtual disc status of an optical disc drive, the method comprising:
    verifying whether an optical disc drive is set in a virtual disc status in which the optical disc drive is prevented from detecting a presence of an optical disc, in response to power being supplied from a user terminal;
    determining whether to perform a detection process of an optical disc, based on whether the optical disc drive is set to the virtual disc status; and
    in response to the optical disc drive not being set to the virtual disc status, and in response to receiving a setting request associated with a virtual disc status of the optical disc drive from the user terminal, providing a result of the detection process of the optical disc to the user terminal.

11. The method of claim 10, wherein the determining of whether to perform the detection process of the optical disc comprises:
    performing the detection process of the optical disc in response to the optical disc drive not being set to the virtual disc status; and
    omitting the detection process of the optical disc in response to the optical disc drive being set to the virtual disc status.

12. The method of claim 10, wherein the user terminal is configured to block power to the optical disc drive in response to the optical disc drive being set to the virtual disc status.

13. The method of claim 10, wherein the user terminal is configured to provide a power supply to the optical disc drive in response to the virtual disc status of the optical disc drive being cancelled.

14. A method of a user terminal for processing a virtual disc status of an optical disc drive, the method comprising:
    reading content of an optical disc in response to the optical disc being present in the optical disc drive that is electrically connected to the user terminal; and
    transferring a setting request to the optical disc drive to set the optical disc drive to the virtual disc status to prevent the optical disc drive from subsequently detecting the presence of the optical disc, wherein
    the user terminal is configured to transfer the setting request to the optical disc drive based on an input of the setting request from a user via an application executed by the user terminal, or by the setting request being generated automatically based on a processing pattern associated with a processing time and/or a processing period of the optical disc drive.

15. A method of a user terminal for processing a virtual disc status of an optical disc drive, the method comprising:
    receiving an input of the optical disc drive that is set to a virtual disc status in which a detection of an optical disc is prevented; and
    transferring a cancellation request to the optical disc drive to cancel the virtual disc status of the optical disc drive,
    wherein the user terminal is configured to transfer the cancellation to the optical disc drive based on receiving an input of the cancellation request from a user via an application executed by the user terminal, or by detecting a pressing of an eject button of the optical disc drive.

16. The method of claim 15, wherein the user terminal is configured to block a supply of power to the optical disc drive in response to the optical disc drive being set to the virtual disc status, and
    to provide the supply of power to the optical disc drive in response to the virtual disc status of the optical disc drive being cancelled.

17. An optical disc drive, comprising:
a detection process performer configured to inform a user terminal whether an optical disc is present in the optical disc drive by performing a detection process of the optical disc;
a status receiver configured to receive a setting request associated with a virtual disc status of the optical disc drive from the user terminal; and
a status setter configured to set the optical disc drive to the virtual disc status in which the detection processor performer is prevented from performing the detection process of the optical disc, and to store the virtual disc status based on the setting request.

18. An optical disc drive, comprising:
a status informer configured to inform a user terminal of whether the optical disc drive is set to a virtual disc status in which the optical disc drive is prevented from detecting a presence of an optical disc;
a cancellation unit configured to cancel the virtual disc status based on a cancellation request that is received from a user terminal; and
a detection process performer configured to perform a detection process of the optical disc in response to the cancellation request.

19. The method of claim 10, wherein the virtual disk status recognizes the optical disc as not being present in the optical disc drive in response to the optical disc being present in the optical disc drive, or
the setting request associated with the virtual disc status of the optical disc drive is set based on a processing pattern of the optical disc drive.

20. The method of claim 14, wherein the optical disc drive is configured to be set to the virtual disc status, based on the setting request received from the user terminal.

* * * * *